United States Patent
Kuwert et al.

Patent Number: 5,986,365
Date of Patent: Nov. 16, 1999

[54] SPINDLE MOTOR

[75] Inventors: Oswald Kuwert, Tutschfelden; Uwe Moench, Spaichingen; Juergen Oelsch, Hohenroth, all of Germany

[73] Assignee: Presicion Motors Deutsche Minebea GmbH, Spaichingen, Germany

[21] Appl. No.: 08/934,616

[22] Filed: Sep. 22, 1997

[51] Int. Cl.[6] ............................. H02K 5/24; H02K 7/14
[52] U.S. Cl. ....................... 310/51; 360/99.08; 310/13
[58] Field of Search ................ 310/51, 13; 360/104, 360/105, 106, 99.04, 99.08, 98.07

[56] References Cited

U.S. PATENT DOCUMENTS

| | | | |
|---|---|---|---|
| 3,683,216 | 8/1972 | Post | 310/67 |
| 5,216,557 | 6/1993 | Elsaesser et al. | 360/99.08 |
| 5,241,229 | 8/1993 | Katakura et al. | 310/51 |
| 5,694,268 | 12/1997 | Dunfield et al. | 360/98.07 |

*Primary Examiner*—Nestor Ramirez
*Assistant Examiner*—Judson H. Jones
*Attorney, Agent, or Firm*—Venable; George H. Spencer; Robert Kinberg

[57] ABSTRACT

The invention concerns a spindle motor, comprising a stationary base flange that supports a central spindle, a hub that is positioned pivoting on the spindle with the aid of suitable bearings and on which at least on fixed-memory disc is arranged, wherein the hub has a rotor magnet on the inside circumference, and comprising a stator-side winding packet, which is arranged at the base flange and is positioned opposite the rotor magnet, wherein the winding packet is extrusion-coated completely with an elastic mass and is thereby connected to the base flange.

6 Claims, 1 Drawing Sheet

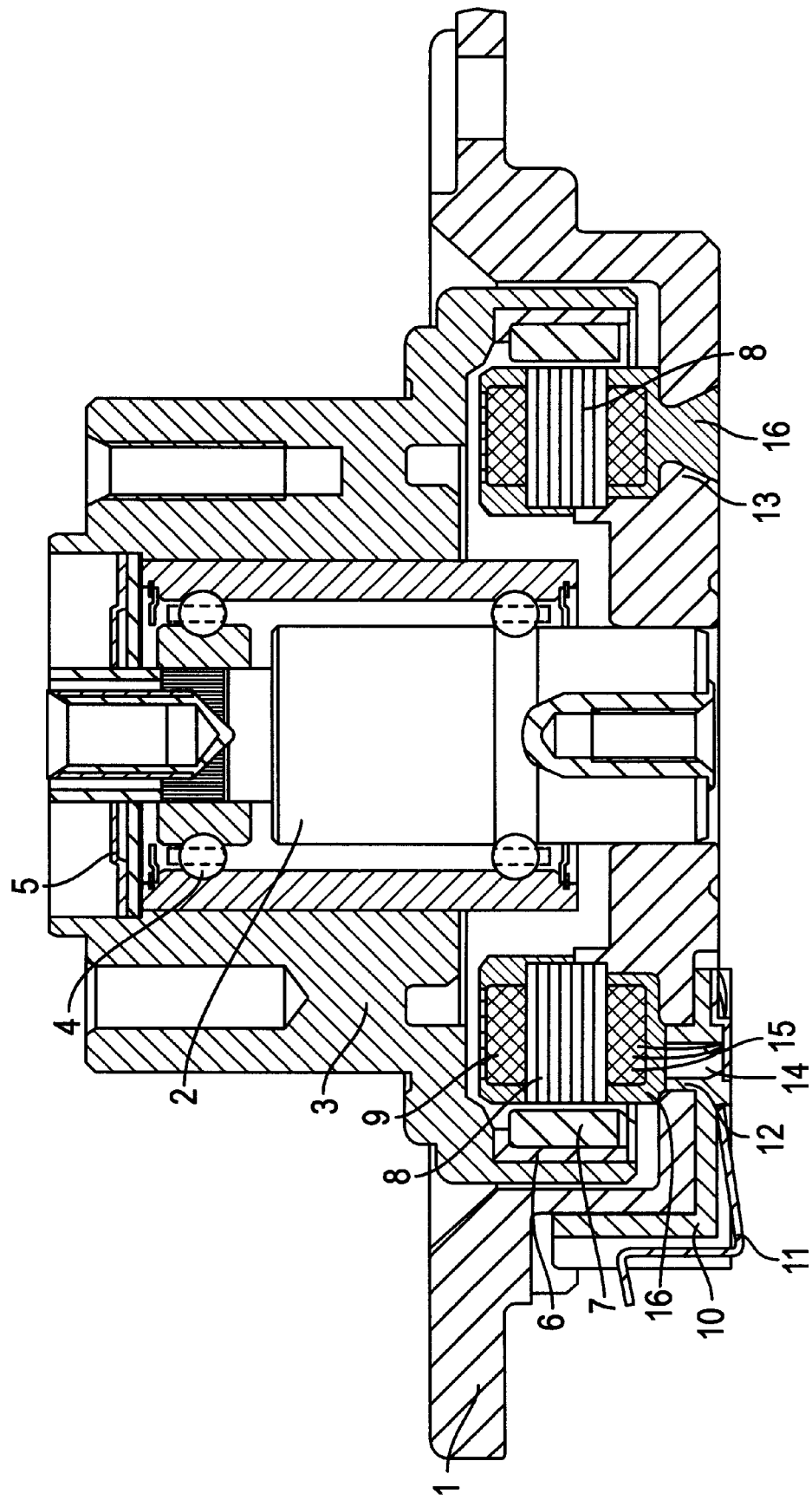

SPINDLE MOTOR

FIELD OF THE INVENTION

The invention concerns a spindle motor, in particular a spindle motor for driving fixed-disc memories.

BACKGROUND OF THE INVENTION

A spindle motor for driving fixed-disc memories is known, for example, from U.S. Pat. No. 5,216,557, which motor comprises a stationary base flange that supports a central spindle. A hub furthermore exists, which is positioned with the aid of suitable bearings, such that it pivots on the spindle and which has at least one fixed-memory disc arranged on it. On the inside circumference, the hub carries a magnetic yoke with a permanent magnet, which constitute a part of the rotor for the spindle motor.

A stator with stator windings is arranged in the standard way opposite the permanent magnet, said stator being attached directly or by means of a fastener to the base flange.

One disadvantage of the above-described, known spindle motor design consists in that the stator is fixedly connected to the base flange, and that whenever current is flowing, vibrations and noises are generated in the stator winding owing to the electromagnetic fields, which are referred to in the following as electromagnetic noises. These noises cause a considerable share of the total spindle motor noise.

When using a spindle motor as drive for fixed-disc memories, it is required that the motor be clean and free of dust. As described in the above, for example, traditional, unprotected stator windings have the additional disadvantage that dirt particles can be released from the stator winding during the motor operation. If no suitable countermeasures are taken, these dirt particles can enter the clean room in which the memory discs are arranged. In the worst case, this leads to the destruction of the fixed-memory discs.

SUMMARY OF THE INVENTION

To counter the aforementioned disadvantages, it is the object of the present invention to suggest a spindle motor that offers a considerably improved suppression of electromagnetic noise and where release of dirt particles from the stator winding is prevented.

The solution is with a spindle motor, comprising a stationary base flange that supports a central spindle, a hub positioned by means of suitable bearings such that it pivots on the spindle and on which at least one fixed-memory disc is arranged, wherein the hub has a rotor magnet on the inside circumference, and comprising a stator with stator winding, which is arranged opposite the rotor magnet on the base flange, wherein the stator is completely extrusion-coated by an elastic material mass and is thus connected to the base flange.

The elastic mass is preferably a thermoplastic synthetic material mass, which additionally has good soundproofing qualities.

The advantage achieved with the present invention consists in that the stator is partially or completely insulated metallically from the base flange. This prevents or strongly suppresses a transfer of electromagnetic noise to the base flange. This effect is increased in that the total stator, together with the stator windings, is surrounded by the soundproofing, elastic mass, so that the electromagnetic noise is already silenced at the stator itself.

An additional advantage consists in that the extrusion-coating of the stator safely prevents a release of dust or dirt particles since the stator winding is completely protected and no dirt particles from the stator winding can reach the outside.

The stator can be produced by using known production methods. For the extrusion-coating or coating by pouring the elastic material mass, the stator is secured in a respective mold. At the same time, the base flange is also inserted into the mold, and both parts are extrusion-coated and secured together.

BRIEF DESCRIPTION OF THE DRAWING

The invention is explained in more detail in the following with the aid of a drawing. Additional features and advantages that are essential to the invention in this case follow from the drawing and its description.

FIG. 1 shows a section of a spindle motor according to the invention.

DETAILED DESCRIPTION OF THE INVENTION

The FIGURE in the drawing shows the design for a spindle motor for driving fixed-disc memories. The spindle motor comprises a stationary base flange 1 that supports a central spindle 2. An approximately bell-shaped hub 3 is provided, which is positioned pivoting on the spindle 2 by means of suitable bearings 4 and on which at least one fixed-memory disc (not shown) is arranged. The bearings 4 are sealed against the outside with suitable sealing means 5. A magnetic yoke 6 with a permanent magnet 7 is arranged on the inside circumference of hub 3. The hub 3, the magnetic yoke 6 and the permanent magnet 7 constitute a part of the rotor for the spindle motor. The stator 8 with stator windings 9, which is connected rigidly to the base flange 1, is located opposite the permanent magnet 7.

The electrical contacting of the stator winding 9 takes place by means of a connector 10 with terminal lugs 11 arranged on it. This connector 10 is fastened to the underside of the base flange 1 and engages with a projection 12 in a recess 13 provided in the base flange 1. A recess 14 is also provided in the projection 12 of connector 10, through which the connecting wires 15 are extended that originate with the stator winding 9 and which can respectively be connected to the terminal lugs 11.

In accordance with the present invention, the stator 8 is completely extrusion-coated by an elastic mass 16 or is poured into an elastic mass 16 and is thus at the same time connected and rigidly secured to the base flange 1. The elastic mass 16 preferably is composed of a thermoplastic synthetic material that hardens elastically. The connector 10 can also be joined through this process to the base flange 1 or the stator 8.

In those regions where no connecting wires 15 must be fed through, the elastic mass 16 that envelopes the stator can fill the recess 13 in the base flange completely, so that a particularly good connection between stator 8 and base flange 1 is created.

Even though the above description contains many details, these must not be viewed as limiting the inventive idea, but serve only to explain a preferred embodiment of the invention.

The following is claimed:

1. A spindle motor comprising:
   a stationary base flange that supports a central spindle;
   a hub that is positioned with suitable bearings such that it pivots on the spindle and on which at least one fixed-memory disc is arranged, wherein the hub has a rotor magnet on the inside circumference; and a stator with stator winding, which is arranged opposite the rotor magnet on the base flange, wherein the stator is completely extrusion-coated with an elastic material mass and is connected to the base flange by means of said extrusion-coating with an elastic material.

2. A spindle motor according to claim 1, wherein the elastic mass comprises a thermoplastic synthetic material.

3. A spindle motor according to claim 1, further comprising:

wires for connecting the stator with electrical contacts;

wherein said stationary base flange comprises a recess, said wires being fed through the recess; and wherein said elastic mass with which said stator is extrusion-coated completely fills portions of the recess through which said wires are not fed.

4. A spindle motor comprising:

a stationary base flange that supports a central spindle;

a hub that is positioned with suitable bearings such that it pivots on the spindle and on which at least one fixed-memory disc is arranged, wherein the hub has a rotor magnet on the inside circumference; and a stator with stator winding, which is arranged opposite the rotor magnet on the base flange, wherein the stator is completely extrusion-coated with an elastic material mass and is connected to the base flange by means of said extrusion-coating with an elastic material, and wherein a connector is provided on the base flange, which has several terminal lugs for the electrical contacting of connecting wires for the stator winding.

5. A spindle motor according to claim 3, wherein the connector is joined rigidly to the base flange through the elastic mass.

6. A method for connecting a stator with a base flange of a spindle motor, comprising the steps of:

securing the stator in a respective mold;

inserting the base flange into the mold at the same time;

securing both structural components together through extrusion-coating or pouring material around them.

* * * * *